Oct. 13, 1964    P. B. SODERBERG ETAL    3,152,786
BIFACED GATE VALVE HAVING TAPERED SEAT SEALING SURFACES
Filed March 1, 1961    3 Sheets-Sheet 1

INVENTORS
PAUL B. SODERBERG
JOHN D. WATTS
JAMES M. HARWELL, JR.
BY Cushman, Darby & Cushman
ATTORNEYS Oct. 13, 1964    P. B. SODERBERG ETAL    3,152,786
BIFACED GATE VALVE HAVING TAPERED SEAT SEALING SURFACES
Filed March 1, 1961    3 Sheets-Sheet 2
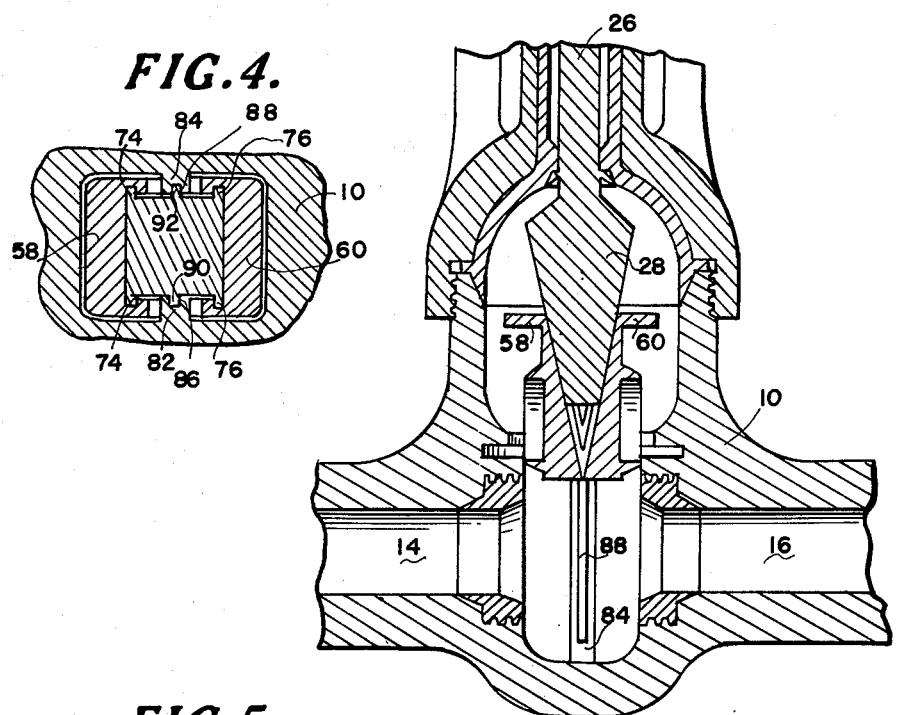
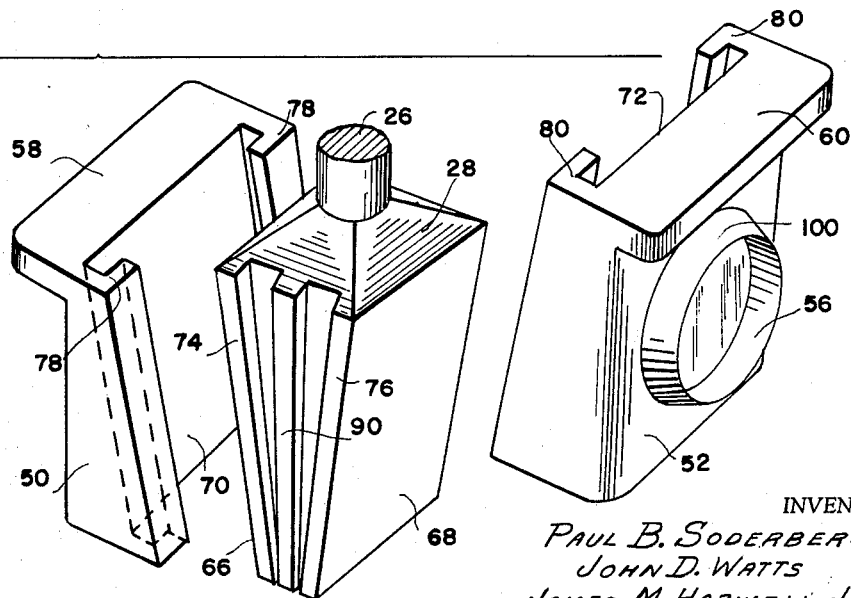
INVENTORS
PAUL B. SODERBERG
JOHN D. WATTS
JAMES M. HARWELL, JR.
BY Cushman, Darby & Cushman
ATTORNEYS

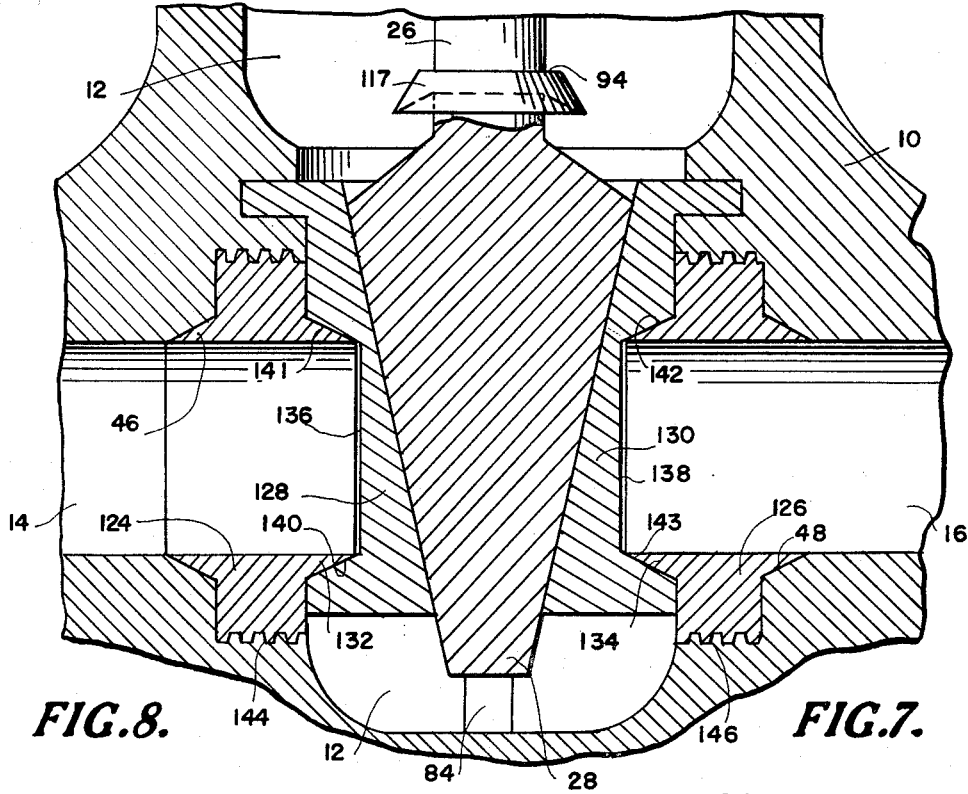
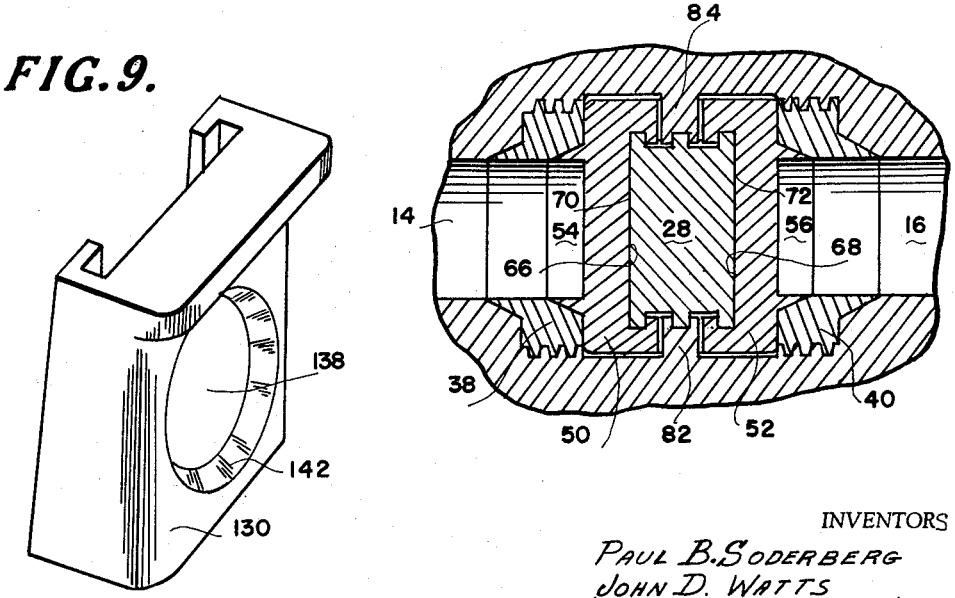
FIG.8. FIG.7. FIG.9.
INVENTORS
PAUL B. SODERBERG
JOHN D. WATTS
JAMES M. HARWELL, JR.
BY Cushman, Darby & Cushman
ATTORNEYS

United States Patent Office 3,152,786
Patented Oct. 13, 1964

3,152,786
BIFACED GATE VALVE HAVING TAPERED
SEAT SEALING SURFACES
Paul B. Soderberg, Palisades Park, N.J., and John D.
Watts and James M. Harwell, Jr., Houston, Tex.,
assignors to Gray Tool Company, Houston, Tex., a
corporation of Texas
Filed Mar. 1, 1961, Ser. No. 92,623
4 Claims. (Cl. 251—167)

This invention relates to valves and more particularly to gate valves especially suitable for high temperature and/or high pressure applications.

Presently available gate valves, while suitable for non-critical applications where both the temperatures and pressures encountered are relatively low, are very often completely unsuitable in critical applications where there are widely fluctuating temperature and pressure conditions of large magnitude. In such critical applications, valves and other equipment used must be capable of completely leak-proof operation for long periods of time, such as, for example in atomic energy applications where leakage of radioactive fluids is completely intolerable, and where frequent maintenance inspections are not possible. Conventional wedge-type valves, wherein flat wedges are forced into firm engagement with flat seats, will effect reasonably good seals in normal non-critical applications. However, for the aforementioned critical applications none of these presently available valves are capable of achieving absolutely reliable bubble-tight seals, since it is virtually impossible to force flat faces against one another under conditions of widely fluctuating temperatures and pressures without the creation of some distortion which will result in an unreliable seal being achieved.

It is therefore a primary object of the present invention to provide novel valve means particularly suitable for critical applications, which valve means is provided with a leak-proof valve seal effected by the deflection of a flexible sealing element when in sealing engagement with a frusto-conical sealing surface, the stored energy within the deflected sealing element providing for the automatic adjustment thereof so as to always sealingly engage the sealing surface regardless of whether or not perfect roundness and/or angularity is present.

It is a further object of the present invention to provide novel valve means of relatively simple and economic construction which is readily adaptable for applications in conjunction with either large or small bores, under both critical and non-critical conditions.

It is a further object of the present invention to provide valve means of novel construction suitable for critical applications, wherein all the respective parts which make-up the valve and associated housing are tightly secured together in a sealed relationship capable of withstanding widely fluctuating temperatures and/or pressures of large magnitudes without leakage.

Another object of the present invention is the provision of a novel wedge-type gate valve wherein there is provided a valve stem extending through the valve housing for activating the valve, the valve stem being provided with means whereby an effective high temperature and/or high pressure seal may be effected between the valve stem and the housing to prevent the leakage of fluid from the housing when the valve is fully opened.

A further object of the present invention concerns the provision of a novel valve means having removable valve seats, wherein there is provided means for removably securing the valve seats to the valve housing with a highly effective seal disposed therebetween.

It is another object of the present invention to provide novel valve means suitable for critical applications, which valve means is so constructed that leak-tight operation is achieved without the need for conventional compressible gaskets or seals, whereby leak-tight operation may be sustained for long periods of time without the need for periodic maintenance, and whereby corrosive materials may be handled, if desired.

It is a further object of the present invention to provide valve means having a flexible valve sealing element adapted to achieve and maintain an effective valve seal by means of the stored energy within the sealing element resulting from its deflection when in sealing engagement, the deflection of the sealing element being within the elastic limit of the material of which it is made.

A further object of the present invention concerns the provision of a novel wedge-type gate valve comprising housing means, removable valve seats, valve sealing members, wedge means for operating the sealing members, a valve stem for operating the wedge means, and a valve bonnet secured to the housing and having the valve stem extending therethrough, wherein there is provided, between the valve seats and the housing means, the sealing members and the valve seats, the valve stem and the bonnet, and the bonnet and the housing means, respectively, highly effective seals, each of the seals being provided with a flexible sealing element adapted to achieve and maintain an effective seal by virtue of the stored energy therein resulting from the deflection thereof when in sealing engagement, to prevent the leakage of fluid from the housing means, and through the valve when closed.

These and other objects of the present invention will become apparent from consideration of the present specification taken in conjunction with the accompanying drawings in which there are shown several embodiments of the present invention by way of example, and wherein:

FIGURE 3 is a fragmentary sectional view thereof illustrating the valve in a fully opened position;

FIGURE 4 is a fragmentary sectional view taken along line 4—4 in FIGURE 1;

FIGURE 5 is an enlarged perspective exploded view of several parts thereof;

FIGURE 7 is an enlarged fragmentary sectional view taken along line 7—7 in FIGURE 1;

FIGURE 8 is an enlarged fragmentary sectional view of a second embodiment of the present invention; and FIGURE 9 is a perspective view of one of the parts of the embodiment illustrated in FIGURE 8.

Figure 1:
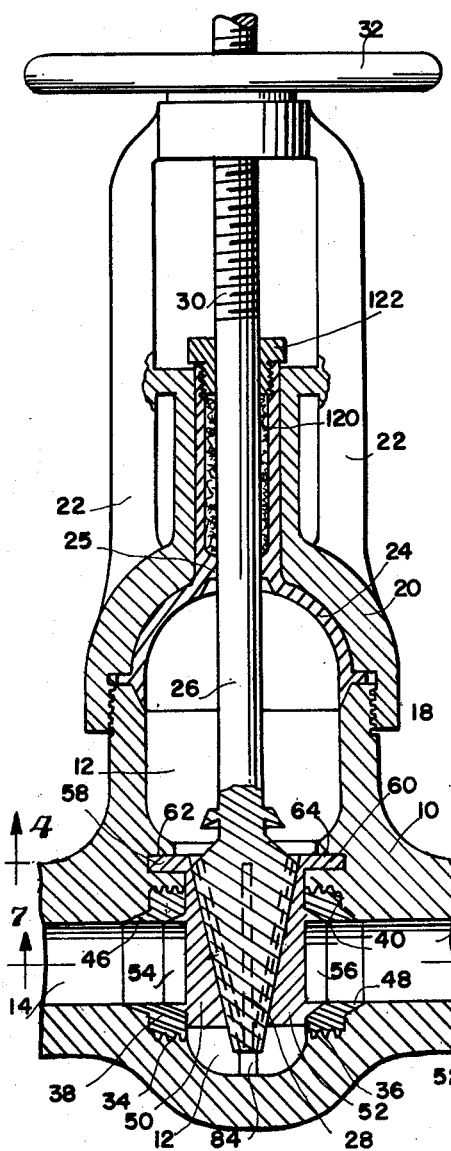
FIGURE 1 is a side elevational view partly in section of one embodiment incorporating the principles of the present invention.

Generally speaking, the present invention is concerned with the provision of valve means comprising housing means having a valve chamber therein and inlet and discharge passageways in communication therewith, a frusto-conical sealing surface disposed around one of said passageways, valve means having a frusto-conical sealing surface thereon disposed within the chamber and adapted for movement therein from a closed position wherein the two sealing surfaces are in sealing engagement to an open position where they are remote from one another, and means for moving the valve means from one position to another. One of the primary aspects of the present invention is the provision of extremely effective seals, both at the valve itself, and also between the respective parts which make up the entire valve construction, thus making it suitable for critical temperature and/or pressure applications.

Referring more particularly to the drawings, there are disclosed two of the many possible embodiments of the present invention. A first embodiment, illustrated in FIGURES 1 through 7, comprises housing means 10 defining a valve chamber 12 therein, and provided with inlet passageway 14 and discharge passageway 16. Since the valve is symmetrical, however, the direction of flow therethrough may be in either direction. As can be seen, in this embodiment the passageways 14 and 16 are disposed along the same axis.

Threadably secured to the upper end of housing means 10 as by means of threads 18 is a valve bonnet 20 having yoke 22 thereon. Disposed within valve bonnet 20 is sealing liner 24, the details of which will be more fully described hereinafter. As can be seen, sealing liner 24 is provided with a vertically disposed central bore 25 in which is slidably disposed a valve stem 26 having wedge means 28 formed integrally at the lower end thereof. The upper end of valve stem 26 is provided with conventional threads 30 which are acted upon by a hand wheel 32 in the conventional manner to raise and lower valve stem 26 and wedge means 28.

Threadably secured to the housing means 10, as by means of threads 34 and 36, are removable valve seats 38 and 40, respectively. Valve seats 38 and 40 are provided with frusto-conical sealing surfaces 42 and 44, and flexible sealing lips 46 and 48, respectively. Disposed within valve chamber 12, between valve seats 38 and 40, is a valve means comprising substantially wedge shaped solid sealing members 50 and 52. Formed integrally with sealing members 50 and 52 are flexible sealing lips 54 and 56, respectively, adapted to sealingly engage valve seat sealing surfaces 42 and 44, respectively, to thus prevent flow through the valve. Also disposed on sealing members 50 and 52 are laterally extending flanges 58 and 60, respectively, adapted to be slidably engaged in slots 62 and 64, respectively, in housing means 10.

As will be appreciated, sealing members 50 and 52 are activated or moved into or out of sealing position by wedge means 28, which in turn is operated by means of hand wheel 32 acting on valve stem 26 in the usual manner. In considering the details of construction of wedge means 28 and the manner in which it activates sealing members 50 and 52, reference should be made to FIGURES 4, 5 and 7, wherein these parts are more clearly illustrated. Thus, wedge means 28 is provided with tapering opposed flat side portions 66 and 68, adapted to slidably engage similarly flat tapering surfaces 70 and 72, respectively, on sealing members 50 and 52, respectively.

In order to maintain the engagement of the wedge means with the two sealing members, the former is provided with laterally extending ribs 74, forming continuations of side portion 66, and laterally extending ribs 76, forming continuations of side portion 68. To maintain the engagement between surfaces 70 and 66, sealing member 50 is provided with opposed flanges 78, adapted to receive ribs 74 therebetween in an interlocking but slidable relationship. Similarly, sealing member 52 is provided with opposed flanges 80 adapted to engage ribs 76 in an interlocking but slidable relationship, to maintain engagement of the surfaces 68 and 72. As will thus be appreciated, movement of wedge means 28 in a vertical direction will serve to move sealing members 50 and 52 in a horizontal direction.

To prevent the rotational movement of wedge means 28 by the rotation of hand wheel 32, and to limit movements of wedge means 28 to those in a vertical direction, housing means 10 is provided with vertically directed inwardly extending ribs 82 and 84, extending into valve chamber 12 and provided with vertically extending grooves 86 and 88, respectively. Wedge means 28 is similarly provided with opposed vertically directed ribs 90 and 92 adapted to be slidably received within grooves 86 and 88, respectively.

Figure 2:
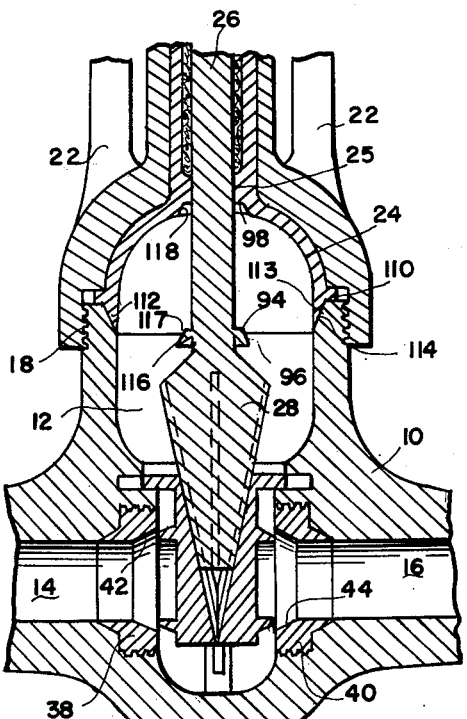
FIGURE 2 is a fragmentary sectional view thereof illustrating the valve in a partially opened position.

The sequence of operation of the valve is illustrated in FIGURES 1, 2 and 3. Thus, in FIGURE 1 the valve is shown in a fully closed position, wherein sealing members 50 and 52 effectively prevent the passage of fluid through passageways 14 and 16. When it is desired to open the valve, hand wheel 32 is rotated so as to start raising valve stem 26 and hence wedge means 28. The vertical movement of wedge means 28 will serve to draw the sealing members 50 and 52 inwardly towards each other, upward movement of the sealing members at this time being prevented by the engagement of flanges 58 and 60 with slots 62 and 64, respectively. As can be seen in FIGURE 2, the lengths of flanges 58 and 60 are such that they do not clear slots 62 and 64 until flexible sealing lips 54 and 56 have cleared the valve seats 38 and 40. Thus, damage to the flexible sealing lips by premature upward movement of the sealing members is prevented by the provision of flanges 58 and 60.

Once the flanges have cleared the slots, continued vertical movement of the wedge means results in the bottom edges of sealing members 50 and 52 abutting one another, as can be seen in FIGURE 2. This abutment thus prevents further inward movement of the sealing members so that further raising of the wedge means results in the lifting or vertical movement of the sealing members. The hand wheel 32 is rotated until the sealing members are in a fully retracted position, as shown in FIGURE 3, wherein the valve is shown wide open. The vertical movement of the valve stem 26 is positively limited by the abutment of a stop shoulder 94 on a flange 96 on the valve stem, with a corresponding stop shoulder 98 formed in sealing liner 24 around bore 25.

One of the very important aspects of the present invention is the specific manner in which the valve seal is effected, wherein the internal energy within sealing lips 54 and 56 caused by their deflection when in sealing engagement, serves to continuously urge them into an always effective sealing relationship, regardless of distortions which may occur in the valve seats by virtue of the high temperatures and/or pressures encountered or the fluctuations thereof. In addition, similar type seals are utilized to prevent leakage between the valve seats and the housing means, between the valve bonnet and the housing means, and between the valve stem and the valve bonnet.

Figure 6:
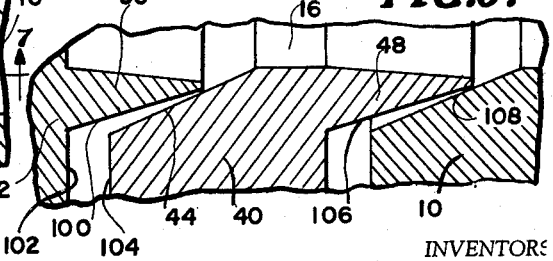
FIGURE 6 is an enlarged fragmentary view in section of a portion of the valve structure illustrated in FIGURE 1.

In FIGURE 6 there are illustrated fragmentary portions of sealing lip 56, valve seat 40 and housing means 10 in a partially assembled relationship, whereby the sealing principles utilized may be clearly visualized. Thus, sealing lip 56 is provided about the outer periphery thereof with a frusto-conical sealing surface 100, adapted to sealingly engage frusto-conical sealing surface 44 on valve seat 40. As can be seen, the included angle of taper (measured from a line parallel to the axes of the sealing surfaces) of the frusto-conical sealing surface on flexible sealing lip 56 is normally (i.e., when relaxed) less than the included angle of taper of frusto-conical sealing surface 44. Thus, when sealing member 52 is urged against valve seat 40 by means of wedge means 28, flexible sealing lip 56 is deflected inwardly until the two sealing surfaces are completely mated in sealing relationship. The internal energy thus created within flexible sealing lip 56 by means of its deflection is utilized to maintain the seal effective at all times. To prevent over-deflection of the sealing lip 56, sealing member 52 and valve seat 40 are provided with opposed abutting stop shoulders 102 and 104, respectively. The abutment of these stop shoulders thus serves to prevent over-deflection of flexible sealing lip 56, such as that which might create stresses therein greater than the elastic limit of the material of which it is formed. The seal thus effected is capable of withstanding extreme magnitudes and fluctuations of temperature and/or pressure without leaking, and yet is capable of being subjected to repeated opening and closing of the valve.

The seal which is effected between valve seat 40 and housing means 10 is exactly the same as that which is effected between sealing member 52 and valve seat 40. Thus, flexible sealing lip 48 is provided with a frustoconical sealing surface 106 adapted to sealingly engage a corresponding frusto-conical sealing surface 108 having a slightly greater angle of taper, on valve means 10. Similar abutting stop shoulders are provided between the valve seat and the housing means to prevent over-deflection of the flexible sealing lip 48. As will be appreciated, the seals utilized are such that it is possible to obtain a smooth bore passageway.

The manner in which an effective seal is established between the housing means 10 and valve seat 38, and between valve seat 38 and sealing member 50, is exactly the same as that previously discussed with respect to sealing member 52 and valve seat 40. Accordingly, the manner in which these seals are effected will not be discussed in detail.

Similarly, high performance seals are utilized between the valve bonnet and the valve housing, and between the valve stem and the valve bonnet. Thus, as can be seen in FIGURE 2, the sealing liner 24 is provided with a peripheral flange 110, and circumferential flexible sealing lip 112. Sealing lip 112 is provided about its outer surface with a frusto-conical sealing surface 113 adapted to sealingly engage a corresponding frusto-conical sealing surface 114 on housing means 10, the former sealing surface normally having an included angle of taper somewhat less than the corresponding angle of taper of the latter sealing surface. The seal thus effected between sealing liner 24 and housing means 10 is identical in all respects to the seals previously discussed. Flange 110 serves to provide positive stop shoulders for limiting the clamping movement of valve bonnet 20 onto housing means 10, to prevent over-deflection of flexible sealing lip 112.

A similar seal is provided between the sealing liner 24 and valve stem 26 in order to prevent the leakage of fluid therebetween when the valve is in fully opened position. Thus, flange 96 is provided with a circumferential flexible sealing lip 116 having frusto-conical sealing surface 117 about the periphery thereof, adapted to sealingly engage a corresponding frusto-conical sealing surface 118 on sealing liner 24. The angular relationship between the respective sealing surfaces, and the principles of operation of the seal are exactly the same as those described previously. Over-deflection of flexible sealing lip 116 is prevented by the abutment of stop shoulder 94 with corresponding stop shoulder 98 on the sealing liner 24.

If desired, further sealing may be effected between the valve stem 26 and valve bonnet 20 by means of conventional packing material 120 tightly held in position in the usual manner by an ordinary packing gland 122, as illustrated in FIGURE 1.

Referring to FIGURES 8 and 9, there is illustrated a second embodiment of the present invention. Generally speaking, this embodiment is almost identical in construction to the first embodiment, differing only in the arrangement of the valve seats and the corresponding sealing members. The principles of operation by which the valve seal is effected is identical in both embodiments.

Thus, there is shown in FIGURE 8, wherein the same reference numerals are used to indicate parts similar to those in the first embodiment, a housing means 10 provided with inlet and discharge passageways 14 and 16. Wedge means 28, valve stem 26 and flange 96 thereon are all exactly the same as in the previous embodiment. However, in this embodiment there are provided valve seats 124 and 126, and sealing members 128 and 130, which four parts are of somewhat different design than the corresponding parts in the first embodiment. Valve seats 124 and 126 are not only provided with flexible sealing lips 46 and 48, respectively, as in the first embodiment, but also with flexible sealing lips 132 and 134, respectively. To provide valve seals, sealing members 128 and 130 are provided with countersunk portions 136 and 138, respectively, having provided about the inner peripheries thereof frusto-conical sealing surfaces 140 and 142, respectively.

As will be appreciated, frusto-conical sealing surfaces 140 and 142 are adapted to sealingly engage corresponding frusto-conical sealing surfaces 141 and 143 on flexible sealing lips 132 and 134, respectively. The method in which the seals are obtained, wherein internal energy of the deflected sealing lips is utilized, is exactly the same in this embodiment as in the previous embodiment. Furthermore, the manner in which the sealing members 128 and 130 are moved into and out of sealing position, as when the valve is opened or closed, is identical to that in the previous embodiment.

As can be seen, the construction of the sealing elements in this embodiment is substantially an inversion of the arrangement of the sealing elements in the previous embodiment. Valve seats 124 and 126 may be tightly secured to the housing means 10 by means of threads 144 and 146, respectively. However, in either this embodiment or the previous embodiment the valve seats may be secured to the housing by other suitable means, if desired, such as by machine screws or other similar fastening devices. Similarly, if desired, the valve seats may be formed integrally with housing means 10, in which case the seals therebetween would not be required.

Because of the manner in which valves according to the present invention may be constructed, and because of the nature of the seals utilized therein, the entire valve structure may be manufactured from metal alloys, or other suitable metallic substances. This is extremely advantageous in critical applications where stainless or other high alloy steels must be used in order to withstand the existing temperature conditions and to be able to resist corrosion effects when the valve is utilized either in a corrosive atmosphere or with corrosive fluids. Since the entire construction may be fabricated from metal, including the respective sealing elements, there is no need for the use of such materials as rubber and/or other gasket materials which are not dependable under critical conditions, which require regular maintenance, and which are subject to corrosion.

Thus, there is disclosed in the above description, and in the drawings, two exemplary embodiments of my invention which fully and effectively accomplish the objects of the invention. However, it will be understood by those skilled in the art that the specific details of construction and arrangement of parts, as described, are by way of example only and are not to be construed as limiting the scope of the invention. We, therefore, do not wish to be limited to the precise details set forth, and intend that the invention embody all such features and modifications as are within the scope of the appended claims.

Having thus described our invention, what we claim as new and desire to secure by Letters Patent is:

1. Valve comprising: housing means defining a valve chamber, said housing means having an inlet passage and a discharge passage communicating with said chamber; a first frusto-conical sealing surface disposed about one of said passages, said surface being carried by removable valve seat means; a sealing member carried within said valve chamber adjacent said first sealing surface, said sealing member having a second frusto-conical sealing surface thereon, the included angle of taper of said second sealing surface measured from a line parallel to the axis of said first and second sealing surfaces being less than the included angle of taper of said first sealing surface, one of said sealing surfaces being deflectable by the other upon movement of said sealing member from a first position spaced from said first sealing surface to a second position in which said deflectable sealing surface is in stressed sealing engagement with the other sealing surface, the internal energy created in said deflectable surface by means of its deflection being utilized to maintain an effective seal and to prevent fluid flow through said one passage; a flexible lip on said removable valve means having a third frusto-conical sealing surface thereon, said housing means having a fourth frusto-conical sealing surface around said one passageway and coaxial with said third sealing surface, the included angle of taper of said third sealing surface measured from a line parallel to the axes of said third and fourth sealing surfaces being normally less than the included angle of taper of said fourth sealing surface, said lip being deflected when said valve seat means is secured to said housing means by engagement with said fourth sealing surface, the internal energy created in said deflectable lip by means of its deflection being utilized to maintain an effective seal between said valve seat means and said housing means; valve operating means joined to said sealing member for effecting said movement of the latter; and means for preventing over-deflection of the deflectable surface which forms the seal between said sealing member and said valve seat means, said preventing means including shoulders on said housing means and on said sealing member which positively abut one another when said sealing member is in said second position.

2. Valve as in claim 1 wherein said second sealing surface is provided on a deflectable lip on said sealing member and wherein the included angle of taper of said second sealing surface is normally less than the included angle of taper of said first sealing surface.

3. Valve as in claim 1 wherein said first sealing surface is provided on a deflectable lip on said valve seat means and wherein the included angle of taper of said first sealing surface is normally less than the included angle of taper of said second sealing surface.

4. Valve as in claim 1 wherein said housing means is provided with an opening therethrough and wherein said operating means comprises a valve stem secured to said sealing member and extending through said opening, said valve further including a frusto-conical sealing surface disposed around said opening, said valve stem including a flexible lip having a frusto-conical sealing surface thereon, the angle of taper of said valve stem sealing surface being normally less than the angle of taper of said housing means sealing surface whereby when said valve stem has moved said sealing member to said first position, said sealing surfaces are operative to sealingly engage one another upon deflection of said latter flexible lip into engagement with said sealing surfaces on said housing means, whereby leakage of fluid within said chamber through said opening is prevented, said housing means and valve stem being provided with corresponding stop shoulders operative to positively abut one another when said sealing member is in said first position to prevent damage to said last-mentioned sealing surfaces by excess movement of said valve stem.

References Cited in the file of this patent

UNITED STATES PATENTS

| | | |
|---|---|---|
| 791,173 | Anglim | May 30, 1905 |
| 831,742 | Pownall | Sept. 25, 1906 |
| 1,000,799 | Grimes | Aug. 15, 1911 |
| 1,200,668 | Swanberg | Oct. 10, 1916 |
| 1,225,002 | Beam | May 8, 1917 |
| 1,584,007 | Brown | May 11, 1926 |
| 1,638,162 | Kirschbraun | Aug. 9, 1927 |
| 1,679,779 | Oberhuber | Aug. 7, 1928 |
| 1,934,255 | Bowler | Nov. 7, 1933 |
| 1,983,163 | Buckman | Dec. 4, 1934 |
| 2,100,996 | Moore | Nov. 30, 1937 |
| 2,194,262 | Allen | Mar. 19, 1940 |
| 2,520,364 | Hobbs | Aug. 29, 1950 |
| 2,600,115 | Kliewer | June 10, 1952 |
| 2,780,233 | Volpin | Feb. 5, 1957 |
| 2,900,999 | Courtot | Aug. 25, 1959 |
| 2,906,491 | Young | Sept. 29, 1959 |
| 2,977,086 | Heinen | Mar. 28, 1961 |

FOREIGN PATENTS

| | | |
|---|---|---|
| 23,833 | Great Britain | Dec. 11, 1893 |
| 527,343 | Germany | June 17, 1931 |